United States Patent
Watanabe et al.

[11] Patent Number: 5,982,152
[45] Date of Patent: Nov. 9, 1999

[54] BATTERY CHARGING APPARATUS

[75] Inventors: Kazunori Watanabe, Mooka; Kazuhiro Hara, Utsunomiya; Shinobu Ochiai, Utsunomiya; Taichi Ogawa, Utsunomiya, all of Japan

[73] Assignee: Honda Giken Kogyo Kabushiki Kaisha, Tokyo, Japan

[21] Appl. No.: 09/058,280

[22] Filed: Apr. 10, 1998

[30] Foreign Application Priority Data

Apr. 14, 1997 [JP] Japan ................................. 9-096155

[51] Int. Cl.⁶ ............................................. H02J 7/04
[52] U.S. Cl. ......................................... 320/150; 320/137
[58] Field of Search .................................. 320/150, 154, 320/160, 137; 429/61, 62

[56] References Cited

U.S. PATENT DOCUMENTS 5,350,900  9/1994  Inage et al. ............................ 219/508
5,703,466  12/1997  Honda et al. .......................... 320/152
5,757,595  5/1998  Ozawa et al. .......................... 320/104
5,834,132  11/1998  Hasegawa et al. ....................... 429/62

*Primary Examiner*—Edward H. Tso
*Assistant Examiner*—Lawrence Luk
*Attorney, Agent, or Firm*—Nikaido Marmelstein Murray & Cram LLP

[57] ABSTRACT

A wasteful consumption of electric energy supplied to charge a battery is reduced when the battery is charged with a low charging efficiency due to a high battery temperature. The battery, typically comprising nickel-hydrogen secondary cells, is prevented from being deteriorated due to a high battery temperature after the battery is charged. While the battery is being charged, the battery is cooled by a battery cooling unit to prevent the charging efficiency from being lowered. If the battery temperature rises above a predetermined temperature, a contactor is opened to temporarily stop the charging of the battery, and the battery is cooled by the battery cooling unit. After the battery is charged, the battery is cooled if the battery temperature is high.

9 Claims, 7 Drawing Sheets

BATTERY CHARGING APPARATUS

BACKGROUND OF THE INVENTION

1. Field of the Invention

The present invention relates to a battery charging apparatus for controlling the charging of a battery and/or the temperature of the battery, and more particularly to a battery charging apparatus suitable for use on an electric vehicle that is propelled by electric energy supplied from a battery as an energy source.

2. Description of the Related Art

As well known in the art, while a battery is being charged, the temperature of the battery increases due to a chemical reaction that occurs in the battery solution. When the battery temperature rises above a predetermined value of +50° C. (which varies depending on the type of the battery), the battery suffers an irreversible deterioration in the form of a reduction in the capacity of the battery.

In order to avoid such a temperature-dependent irreversible deterioration, there have heretofore been proposed two temperature control processes that can be carried out during the charging of a battery.

According to the first temperature control process, when the temperature of a battery rises above a predetermined value while the battery is being charged, the charging of the battery is temporarily stopped, and the battery is cooled by ambient air. When the battery temperature drops below the predetermined value, the charging of the battery is resumed.

According to the second temperature control process, when the temperature of a battery rises above a predetermined value while the battery is being charged, a forced-cooling unit is operated to cool the battery with forced air, and the battery is continuously charged.

The first temperature control process is effective to prevent the battery from being deteriorated due to a rise in the battery temperature. However, from the standpoint of a battery charging efficiency (a portion, stored as a charge in the battery, of a charging current that is supplied to the battery), the first temperature control process suffers the following problems:

As the battery temperature goes higher and the battery is charged more closely to the fully charged state, the battery charging efficiency becomes lower, making the battery chargeable less efficiently. When the battery charging efficiency is lower, excessive electric energy is consumed by an electric decomposition of the electrolytic solution of the battery, resulting in an increase in the battery temperature. Stated otherwise, when the battery is charged more closely to the fully charged state, i.e., when the SOC (State of Charge) of the battery is high, the battery is charged at a high temperature, and a large amount of charging electric energy is wasted.

The second temperature control process allows the battery to be continuously charged, but is not optimum from the standpoint of a battery charging efficiency because the temperature at which the forced-cooling unit is turned on is the same as a constant temperature set for preventing the battery from being deteriorated.

Nickel-hydrogen secondary cells of a battery exhibit so-called soak-back characteristics according to which the battery temperature rises after it the battery has stopped being charged. The temperature rise after the battery has been charged cannot be prevented by the first and second temperature control processes.

SUMMARY OF THE INVENTION

It is a general object of the present invention to provide a battery charging apparatus which is capable of minimizing an wasteful consumption of electric energy when it is supplied to charge a battery.

A major object of the present invention is to provide a battery charging apparatus which is capable of preventing the temperature of a battery from increasing even after the battery has stopped being charged.

The above and other objects, features, and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
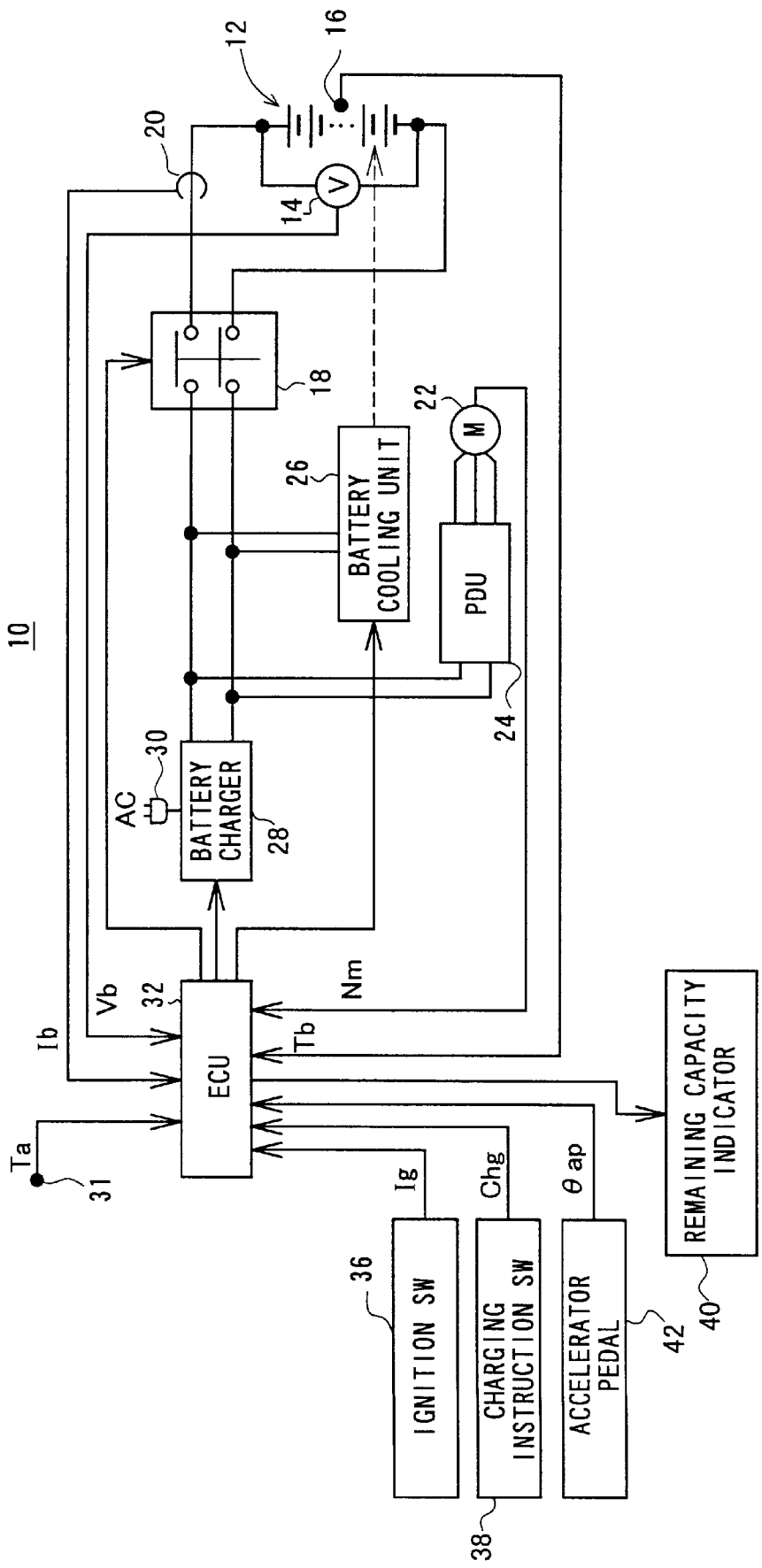
FIG. 1 is a block diagram of an electric vehicle which incorporates a battery charging apparatus according to the present invention.

As shown in FIG. 1, an electric vehicle 10 which incorporates a battery charging apparatus according to the present invention has a high-voltage battery 12 having a high rated voltage of +288 V. The battery 12 comprises, for example, 24 series-connected nickel-hydrogen secondary cells each having a rated voltage of +12 V. A voltage sensor (voltage detecting means) 14 is connected to the battery 12 for detecting a battery voltage Vb thereof. A temperature sensor (temperature detecting means) 16 is attached to the battery 12 for detecting a temperature Tb thereof. The voltage across each of the nickel-hydrogen secondary cells that make up the battery 12 will hereinafter be referred to as a battery cell voltage. The battery voltage Vb is equal to the product of the battery cell voltage and the number of battery cells, i.e., 24.

Positive and negative terminals of the battery 12 are connected to terminals of a contactor (relays, switches) 18 by conductors, one of which has a current sensor (current detecting means) 20 for detecting a battery current (a charging current and a discharging current) Ib which flows into and from the battery 12.

To other terminals of the contactor 18, there are connected a power drive unit (PDU) 24 for energizing a three-phase motor 22 as a load according to a PWM (Pulse Width Modulation) control process, a battery cooling unit 26 comprising a radiator for cooling the battery 12, and a vehicle-mounted battery charger 28 for charging the battery 12. The battery charger 28 is connected through a charging connector (not shown) to a plug 30 which will be connected an external power supply such as an AC 200V power supply when the battery 12 is charged. When the electric vehicle runs, the charging connector is disconnected from the external power supply.

The electric vehicle 10 also has an ECU (Electric Control Unit) 32 operable as control, decision, processing, calculating, time measuring means. The ECU 32 is in the form of a microcomputer which comprises a CPU (Central Processing Unit), a ROM serving as memory means that stores a system program and an application program for detecting a remaining capacity of the battery 12, a RAM serving as working memory means for storing temporary data, a timer (time measuring means) for measuring time, and input/output interfaces including an A/D converter and a D/A converter.

The ECU 32 is supplied with the battery voltage Vb from the voltage sensor 14, the battery temperature Tb from the temperature sensor 16, the battery current Ib from the current sensor 20, an ambient temperature Ta from a temperature sensor 31, an ignition signal Ig generated as an on/off signal from an ignition switch 36, a charging instruction signal Chg as an on/off signal from a charging instruction switch 38, an accelerator opening signal θap from an accelerator pedal 42, and a rotational speed signal (hereinafter referred to as a rotational speed) Nm from an encoder attached to the motor 22.

Based on these supplied signals, the ECU 32 controls the battery charger 28 and the battery cooling unit 26, and controls the indication of the remaining capacity of the battery 12 on a remaining capacity indicator 40 on an instrumental panel of the electric vehicle 10.

The battery cooling unit 26 comprises a cooling fan, for example, and is controlled so as to be selectively stopped and operated. When operated, the battery cooling unit 26 is selectively in a high-speed rotation mode (Hi drive mode) and a low-speed rotation mode (Lo drive mode).

The ECU 32 determines an output torque (also referred to as a required torque and corresponding to an electric energy required by the motor 22) to be outputted from the motor 22 based on a stored lookup table or equations, generates an energization signal indicative of a duty ratio for an inverter of the power drive unit 24 based on the determined output torque, and supplies the energization signal to the power drive unit 24.

Figure 2:
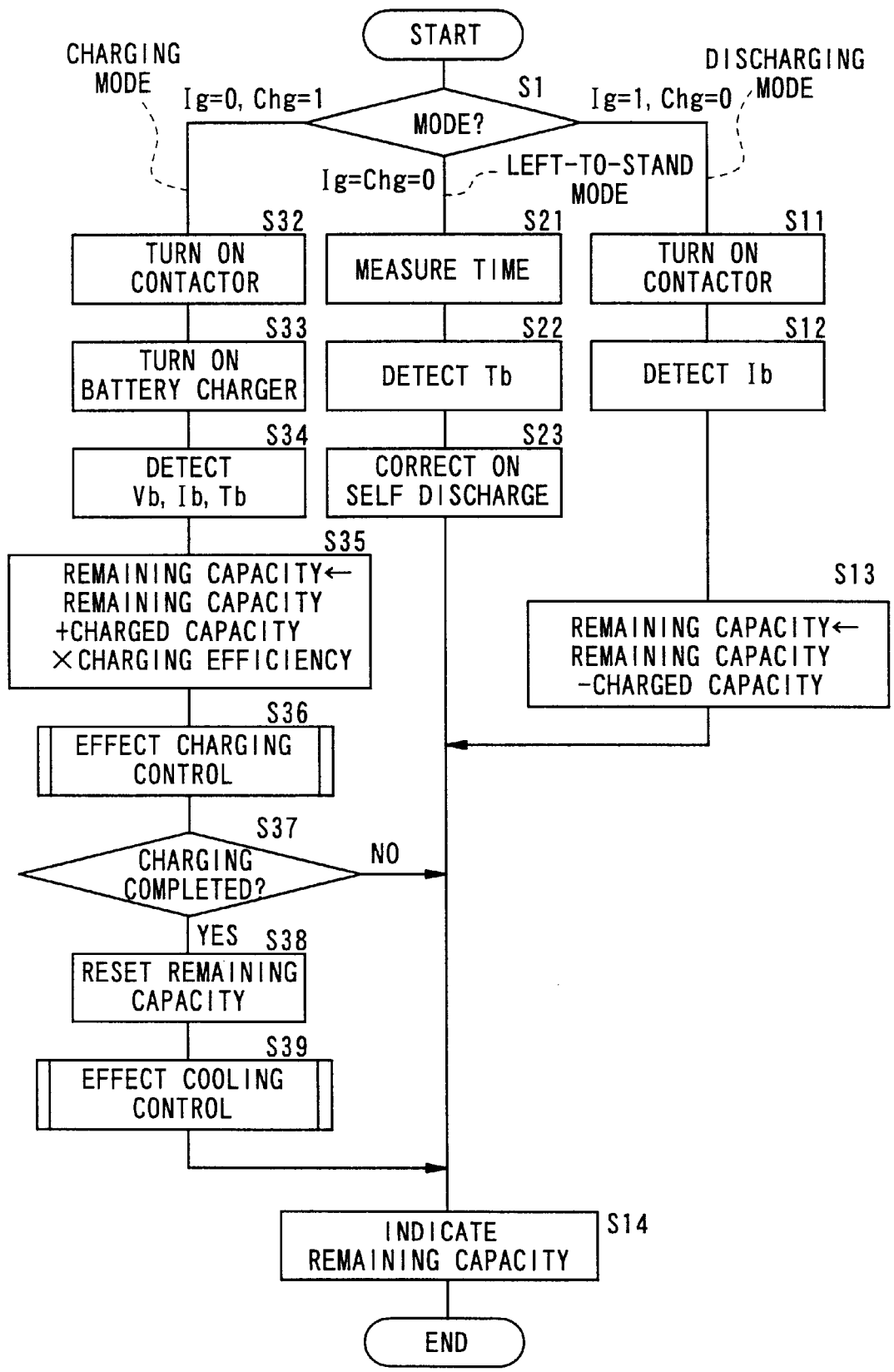
FIG. 2 is a flowchart of a control process of the battery charging apparatus shown in FIG. 1.

A control process carried out by the ECU 32 mainly for charging the battery 12 will be described below with reference to FIG. 2.

The ECU 32 decides in a step S1 whether a present mode (status) of the battery 12 is a charging mode, a left-to-stand mode, or a discharging mode (usually referred to as a running mode) based on the combination of the levels of the ignition signal Ig and the charging instruction signal Chg which have been read. When the battery charger 28 is charging the battery 12 {the charging instruction switch 38 is turned on (closed), with the charging instruction signal Chg=1}, the motor 22 is prohibited from being energized {the ignition switch 36 is turned on (closed), with the ignition signal Ig=1}.

If the ignition signal Ig is Ig=0 and the charging instruction signal Chg is Chg=1, then the present mode of the battery 12 is the charging mode. In the charging mode, the ECU 32 can confirm through the battery charger 28 whether the plug 30 is connected to the external AC power supply so that the battery charger 28 is actually connected to the external AC power supply.

If the ignition signal Ig is Ig=1 and the charging instruction signal Chg is Chg=0, then the present mode of the battery 12 is the discharging mode (running mode).

If the ignition signal Ig is Ig=0 and the charging instruction signal Chg is Chg=0, then the present mode of the battery 12 is the left-to-stand mode, i.e., the battery 12 is neither charged nor discharged.

If the present mode of the battery 12 is the discharging mode in the step S1, then the ECU 32 closes the contactor 18 in a step S11, and supplies electric energy from the battery 12 through the PDU 42 to the motor 22.

Thereafter, each time a predetermined charging time ΔTdischg (e.g., ΔTdischg=1 second) elapses, the ECU 32 detects a battery current (charging current) Ib in a step S12.

Then, the ECU 32 calculates an SOC (State of Charge), i.e., a remaining capacity, according to the equation (1), given below, in a step S13. The remaining capacity is expressed in ampere-hours (Ah), and the SOC in %. Since the fully charged capacity is a maximum remaining capacity and the SOC is equal to a value produced by dividing the present remaining capacity by the fully charged capacity and expressing the quotient in percentage, the fully charged capacity and the SOC are easily interchangeable. For an easier understanding of the present invention, the SOC is expressed in % and the remaining capacity in Ah or %.

$$\text{Remaining capacity} \leftarrow \text{remaining capacity discharged-capacity} \quad (1)$$

According to the equation (1), a present remaining capacity on the left side of the symbol ← is calculated by subtracting a discharged capacity (the battery current Ib×the predetermined charging time ΔTdischg) from the preceding remaining capacity stored in the memory that is backed up. The equation (1) indicates that the data stored in the memory is updated from the remaining capacity on the right side of the symbol ← to the remaining capacity on the left side of the symbol ←. All equations including the symbol ← which will be described below should be interpreted as indicating the same operation.

Based on the calculated remaining capacity, the remaining capacity indicated on the remaining capacity indicator 40 is updated in a step S14.

If the present mode of the battery 12 is the left-to-stand mode in the step S1, then the ECU 32 starts measuring time with the timer in a step S21. The ECU 32 detects a battery temperature Tb when the battery 12 is left to stand in a step S22. Based on the measured time in which the battery 12 is left to stand, the CPU 32 calculates a self-discharged quantity using the battery temperature Tb as a parameter, and determines a remaining capacity by subtracting a remaining capacity based on the calculated self-discharged quantity from the present remaining capacity, according to a self-discharged-quantity-based correction subroutine in a step S23.

The remaining capacity in the left-to-stand mode can be calculated according to the equation (2) given below. Specifically, a table of self-discharged quantities per unit time with respect to battery temperatures Tb as a parameter (since the unit of self-discharged quantities is a discharged quantity/time, the self-discharged quantity is also referred to as a self-discharged rate) is generated and stored in the memory. Based on a battery temperature Tb, the stored table is referred to, and a self-discharged rate at the battery temperature Tb is determined from the table. The determined self-discharged rate is multiplied by the measured time in which the battery 12 is left to stand, thus determining a self-discharged quantity depending on the time in which the battery 12 is left to stand.

Remaining capacity←remaining capacity−self-discharged quantity (2)

The remaining capacity indicated on the remaining capacity indicator 40 is updated (corrected) according to the calculated remaining capacity.

If the battery 12 is in the charging mode, then the ECU 32 closes the contactor 18 to electrically connect the battery charger 28 to the positive and negative terminals of the battery 12 in a step S32, and then turns on the battery charger 28 in a step S33.

Each time a predetermined charging time ΔTchg elapses, the ECU 32 detects a battery voltage Vb, a battery current (charging current) Ib, and a battery temperature Tb in a step S34. The predetermined charging time ΔTchg is set to ΔTchg=1 minute, for example.

Then, the ECU 32 calculates a remaining capacity according to the following equation (3) in a step S35:

Remaining capacity←remaining capacity+charged capacity×charging efficiency (3)

According to the equation (3), a present remaining capacity on the left side of the symbol←is calculated as the sum of a preceding remaining capacity stored in the memory and the product of a charged capacity (the battery current Ib×the predetermined charging time ΔTchg) and a charging efficiency (also referred to as an efficiency). The equation (3) indicates that the data stored in the memory is updated from the remaining capacity on the right side of the symbol←to the remaining capacity on the left side of the symbol ←. The charging efficiency, represented by η, is updated by a constant depending on the battery temperature Tb and the SOC. The charging efficiency η is determined in a manner which will be described later on. The charging efficiency η has a default value in the range of 0.9–0.95.

Thereafter, the ECU 32 effects a charging control process. There are two charging control process subroutines according to first and second embodiments of the present invention. In the charging control process subroutine according to the first embodiment, the charging of the battery 12 is temporarily stopped or interrupted when the charging efficiency η determined from the SOC and the battery temperature Tb is smaller than a predetermined value. In the charging control process subroutine according to the second embodiment, a battery temperature Tb at which the charging efficiency η is smaller than a predetermined value is determined, and the charging of the battery 12 is temporarily stopped or interrupted when the actual battery temperature goes higher than the determined battery temperature Tb. The first and second embodiments are the same as each other in that the charging of the battery 12 is temporarily stopped or interrupted when the charging efficiency TI is smaller than a predetermined value.

Figure 3:
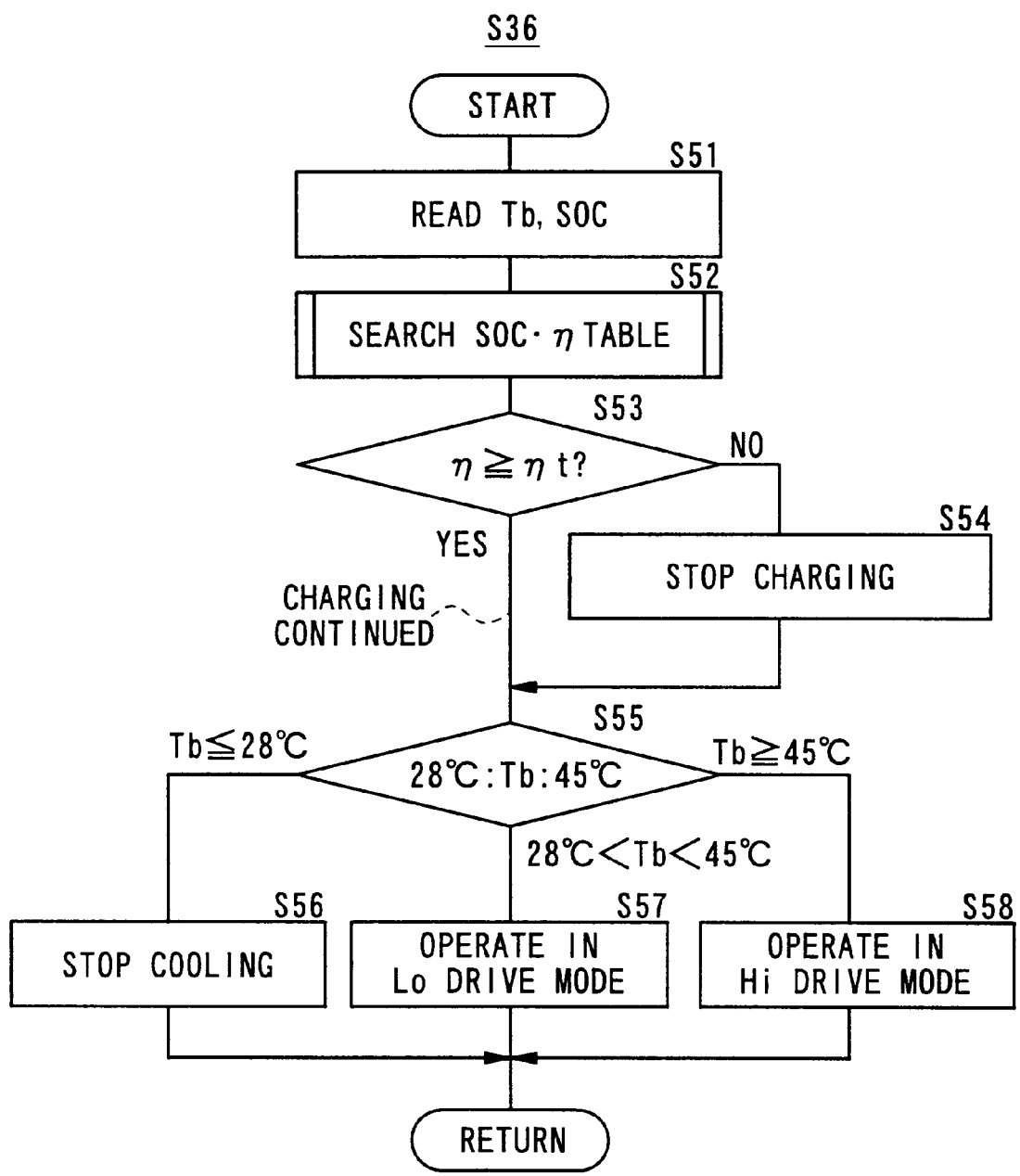
FIG. 3 is a flowchart of a charging control subroutine, according to a first embodiment of the present invention, of the control process shown in FIG. 2.

The charging control process subroutine according to the first embodiment will be described below with reference to FIG. 3.

The battery temperature Tb and the SOC are read in a step S51.

Figure 4:
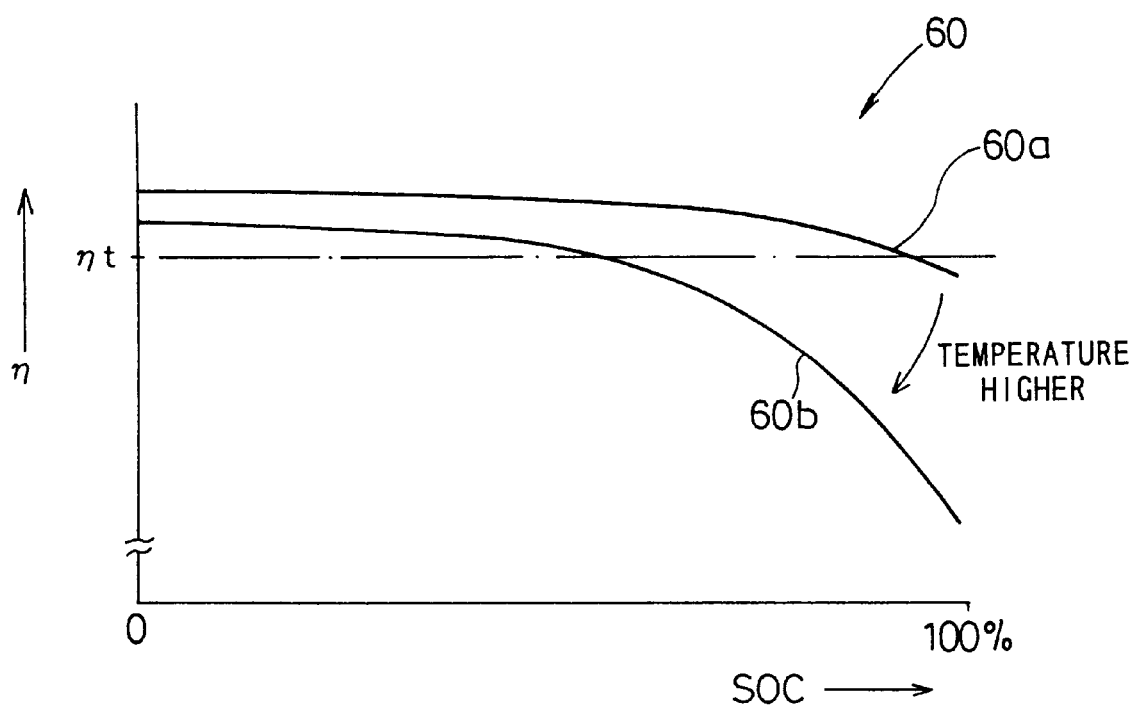
FIG. 4 is a diagram of a table of states of charge and charging efficiencies with battery temperatures used as a parameter.

Based on the battery temperature Tb and the SOC which are read, a SOCη table 60 (see FIG. 4) of SOCs and charging efficiencies η is searched for a corresponding charging efficiency η in a step S52. The SOCη table 60 is a table for determining a charging efficiency η using battery temperatures Tb (at intervals of 1° C., for example) as a parameter, and represents an association between SOCs indicative of charged quantities and charging efficiencies η of the battery 12. In FIG. 4, a characteristic curve 60a is a curve when the battery temperature Tb is relatively low, e.g., Tb=15° C., and a characteristic curve 60b is a curve when the battery temperature Tb is relatively high, e.g., Tb=45° C. It can be understood from FIG. 4 that the charging efficiency η is lower as the battery temperature Tb is higher and the SOC is greater.

A charging efficiency η corresponding to a certain SOC can be determined by referring to the SOCη table 60.

The determined charging efficiency η is then compared with a charging efficiency lower limit ηt (see FIG. 4) in a step S53. The charging efficiency lower limit ηt is of such a value that when the battery 12 is charged with a charging efficiency η lower than the charging efficiency lower limit ηt, a large amount of charging electric energy is wasted. The charging efficiency lower limit ηt may be set to an appropriate value. A deterioration of the battery 12 may be detected, and the charging efficiency lower limit ηt may be changed on the basis of the detected deterioration of the battery 12.

If the determined charging efficiency η is smaller than the charging efficiency lower limit ηt (η<ηt) (NO in the step 53), then the charging of the battery 12 is stopped in a step S54. Specifically, the charging of the battery 12 is stopped by turning off the contactor 18 while the external AC power supply remains connected to the battery charger 28. If the determined charging efficiency η is equal to or greater than the charging efficiency lower limit ηt (η≦ηt) (YES in the step 53), then the charging of the battery 12 is continued.

When the charging of the battery 12 is continued or stopped, the battery temperature Tb is compared with a fan deactivation temperature Ts and a fan activation temperature Td in a step S55. The fan deactivation temperature Ts is set to Ts=28° C., and the fan activation temperature Td is set to Td=45° C. If the battery temperature Tb is relatively low, i.e., Tb≦Ts=28° C., then the battery cooling unit 26 stops delivering cooling air in a step S56. If the battery temperature Tb is relatively high, i.e., 28° C.=Ts<Tb<Td=45° C., then the battery cooling unit 26 operates in the low-speed rotation mode (Lo drive mode) to cool the battery 12 with a relatively low rate of cooling air in a step S57. If the battery temperature Tb is very high, i.e., Tb>Td, then the battery cooling unit 26 operates in the high-speed rotation mode (Hi drive mode) to cool the battery 12 with a relatively high rate of cooling air in a step S58. Because the battery 12 is thus cooled in different modes, the charging efficiency η may be increased even at the same SOC (see FIG. 4).

Figure 5:
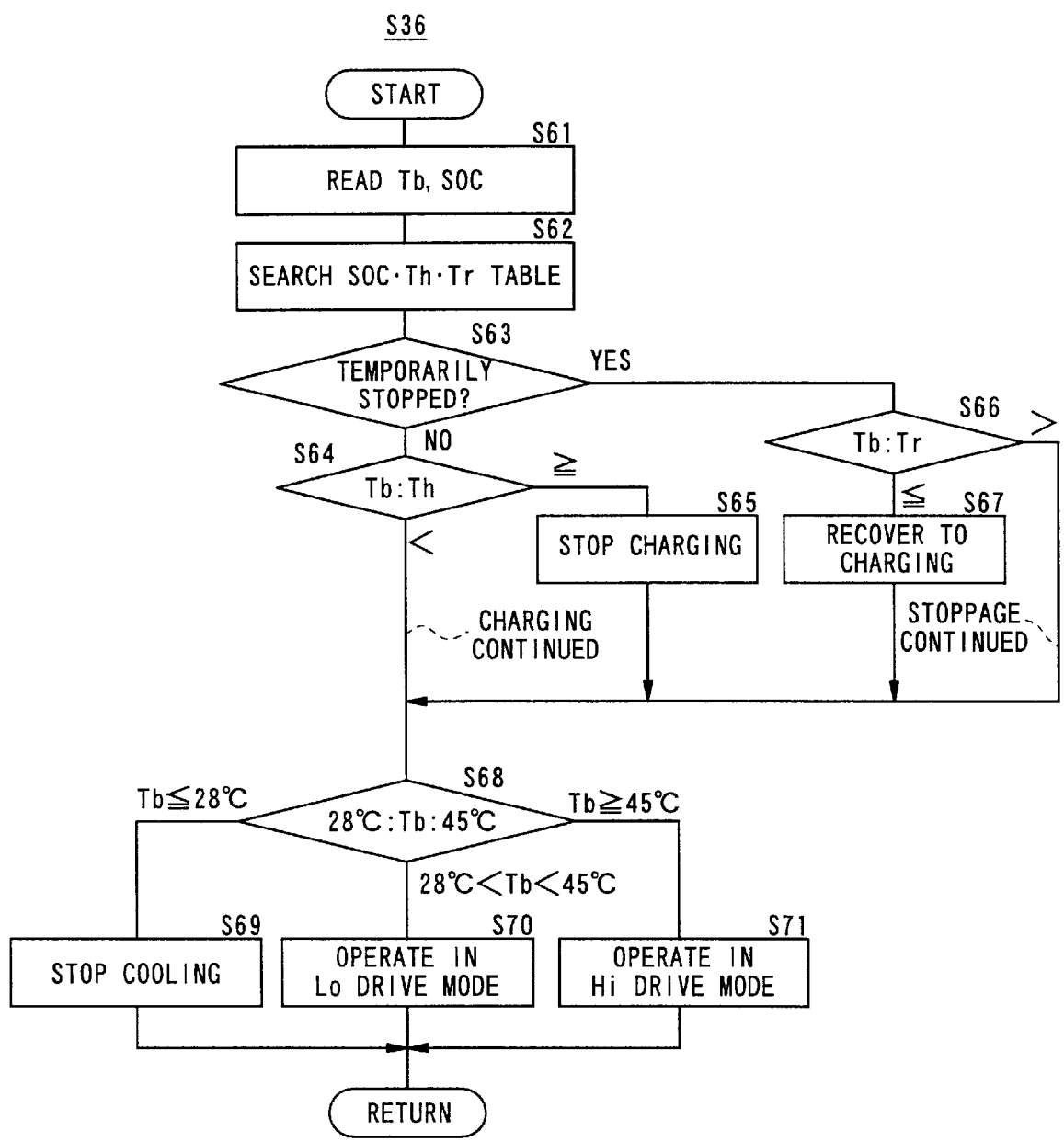
FIG. 5 is a flowchart of a charging control subroutine, according to a second embodiment of the present invention, of the control process shown in FIG. 2.

The charging control process subroutine according to the second embodiment will be described below with reference to FIG. 5.

The battery temperature Tb and the SOC are read in a step S61.

Based on the SOC which is read, a SOC•Th•Tr (SOC•interruption temperature•charging recovery temperature) table 70 (see FIG. 6) is searched for an interruption temperature Th and a charging recovery temperature Tr which correspond to the battery temperature Tb in a step S62. The SOC•Th•Tr table 70 is a table for determining the interruption of and recovery from the charging of the battery 12, and exhibits a hysteresis characteristic. Specifically, while the battery 12 is being charged, when the battery temperature Tb goes higher than the interruption temperature Th represented by an upper characteristic curve, the charging efficiency η is presumed to drop below a predetermined value, and the charging of the battery 12 is temporarily stopped or interrupted. While the charging of the battery 12 is being temporarily stopped, when the battery temperature Tb becomes lower than the charging recovery temperature Tr represented by a lower characteristic curve, the charging efficiency η is presumed to be increased (recovered), and the charging of the battery 12 is resumed.

Figure 6:
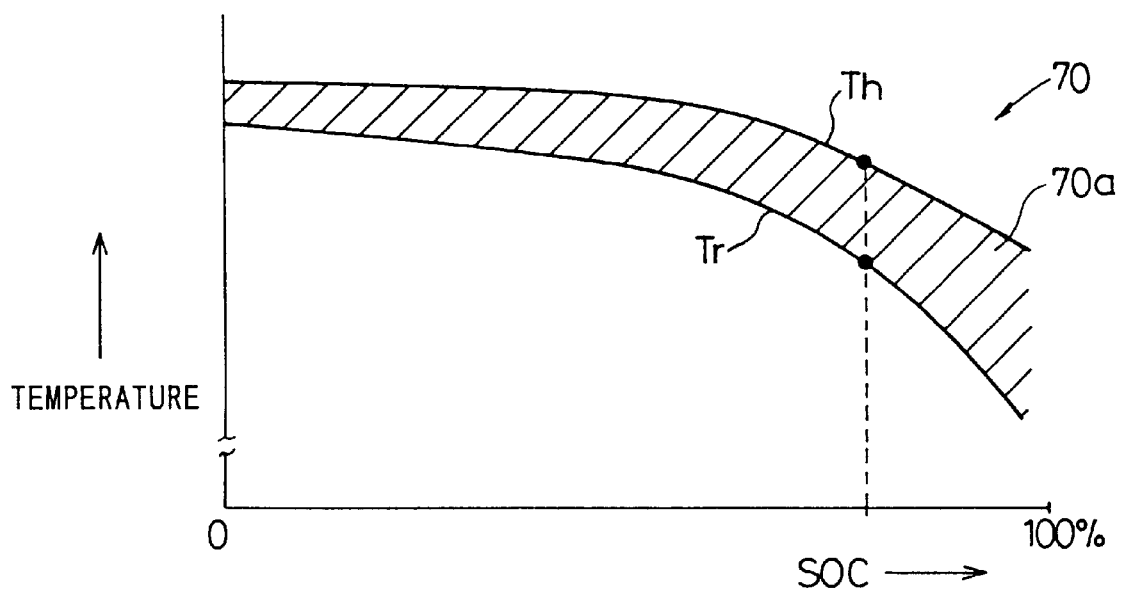
FIG. 6 is a diagram of a table of states of charge, charging recovery temperatures, and charging interruption temperatures.

Thereafter, it is decided whether the charging of the battery 12 is being temporarily stopped in a step S63. If the charging of the battery 12 is not being temporarily stopped, but the battery 12 is being charged, then the interruption temperature Th detected in the step S62 by referring to the table shown in FIG. 6 is compared with the battery temperature Tb in a step S64. If the battery temperature Tb is equal to or higher than the interruption temperature Th (Tb≧Th), then the charging of the battery 12 is stopped in a step S65. If the battery temperature Tb is smaller than the interruption temperature Th (Tb<Th), then the charging of the battery 12 is continued.

If the charging of the battery 12 is being temporarily stopped (YES in the step S63), then the battery temperature Tb and the charging recovery temperature Tr are compared with each other in a step S66. If the battery temperature Tb does not drop below the charging recovery temperature Tr (Tb>Tr), then the charging of the battery 12 is continuously temporarily stopped. If the battery temperature Tb drops to or below the charging recovery temperature Tr (Tb≦Tr), then the stoppage of the charging of the battery 12 in the previous step S65 is canceled, and the charging of the battery 12 is recovered in a step S67.

Subsequent steps S68–S71 are identical to the steps S55–S58. Specifically, the battery temperature Tb is compared with a fan deactivation temperature Ts (=28° C.) and a fan activation temperature Td (=45° C.) in a step S68. If the battery temperature Tb is relatively low, i.e., Tb≦Ts, then the battery cooling unit 26 stops delivering cooling air in a step S69. If the battery temperature Tb is relatively high, i.e., Ts<Tb<Td, then the battery cooling unit 26 operates in the low-speed rotation mode (Lo drive mode) to cool the battery 12 with a relatively low rate of cooling air in a step S70. If the battery temperature Tb is very high, i.e., Tb>Td, then the battery cooling unit 26 operates in the high-speed rotation mode (Hi drive mode) to cool the battery 12 with a relatively high rate of cooling air in a step S71.

After the step S36 (see FIG. 2), a charging completion decision process is carried out in a step S37. The charging completion decision process in the step S37 decides whether the battery 12 is fully charged or not by comparing a rate of increase in the battery temperature (dTb/dt: temperature change/unit time), a rate of increase in the battery voltage (dVb/dt: voltage change/unit time), or a rate of change of their differential (secondary differential) with a stored pattern.

If the charging of the battery 12 is not completed, then the remaining capacity of the battery 12 is indicated on the remaining capacity indicator 40 in the step S14, and control goes back to the step S1.

If the charging of the battery 12 is completed, then the remaining capacity of the battery 12 is reset to the rated capacity of the battery 12 in a step S38. When the battery 12 is fully charged, the remaining capacity is reset to the rated capacity for the purpose of preventing the remaining capacity from suffering a large error due to a measurement error of the current sensor 20, etc.

Figure 7:
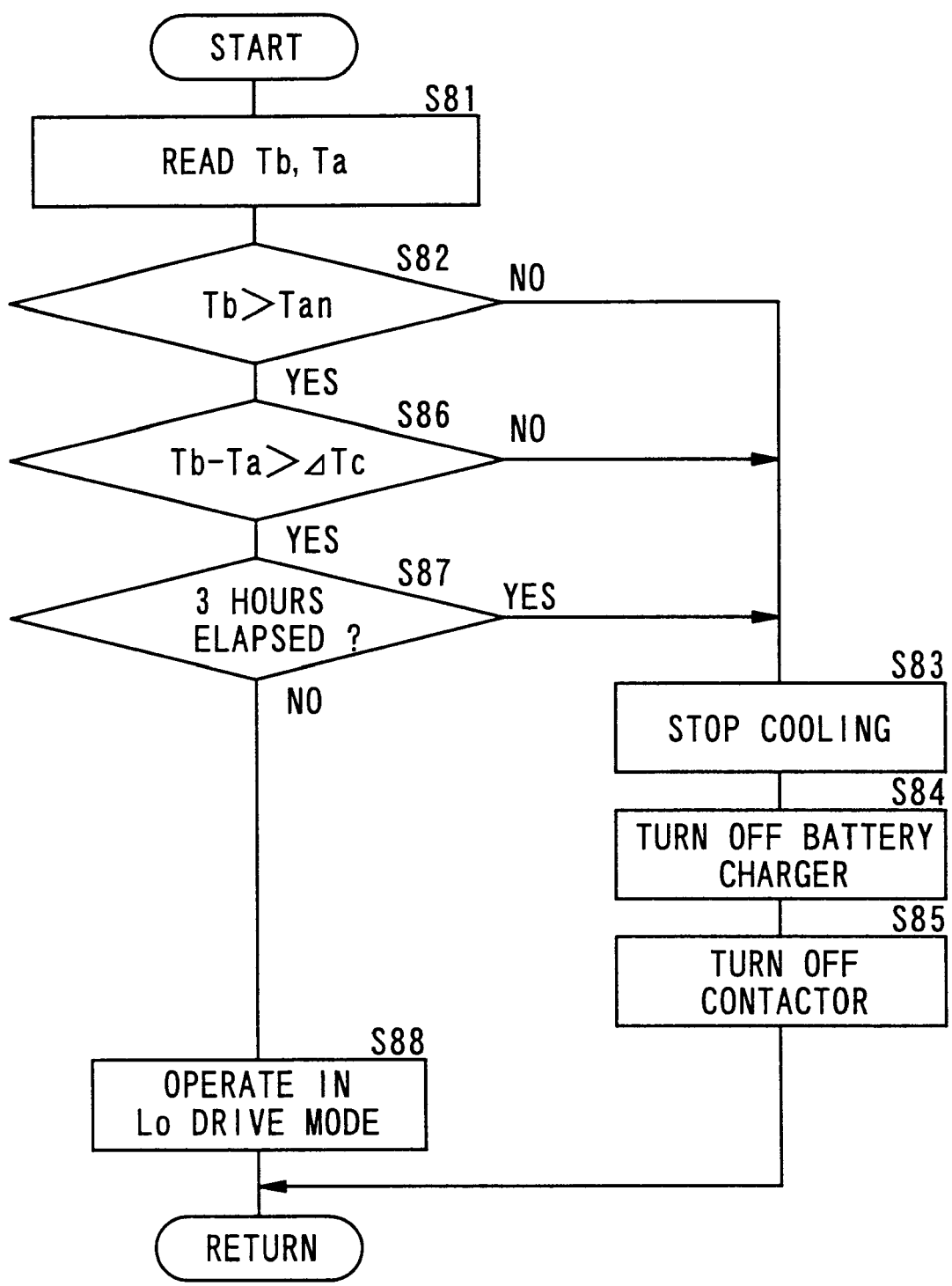
FIG. 7 is a flowchart of a battery cooling subroutine of the control process shown in FIG. 2.

After the remaining capacity is reset to the rated capacity, i.e., after the battery 12 is fully charged and the normal charging thereof is completed, a battery cooling subroutine is carried out to cool the battery 12 in a step S39. The battery cooling subroutine in the step S39 will be described below with reference to FIG. 7.

The battery temperature Tb and the ambient temperature Ta are read in a step S81. Then, it is decided whether the battery temperature Tb thus read is higher than an after-charge required cooling temperature Tan (e.g., Tan=55° C.) in a step S82. If the battery temperature Tb is lower than the after-charge required cooling temperature Tan, then the battery cooling unit 26 is deactivated, and the battery 12 is cooled by ambient air in a step S83. Thereafter, the battery charger 28 is turned off in a step S84, and the contactor 18 is turned off to bring the charging mode to an end in a step S85.

If the battery temperature Tb is higher than the after-charge required cooling temperature Tan, then it is decided whether the difference (Tb−Ta) between the battery temperature Tb and the ambient temperature Ta is greater than a coolable temperature difference ΔTc in a step S86. If the difference (Tb−Ta) is smaller than the coolable temperature difference ΔTc, then the cooling of the battery 12 is stopped and the charging of the battery 12 is completed in the steps S83–S85. If the difference (Tb−Ta) is larger than the coolable temperature difference ΔTc, then it is decided whether 3 hours have elapsed after the charging of the battery 12 is completed (YES in the step S37) in a step S87. If 3 hours have elapsed, then the cooling of the battery 12 is stopped and the charging of the battery 12 is completed in the steps S83–S85.

If 3 hours have not elapsed, then the battery cooling unit 26 operates in the low-speed rotation mode (Lo drive mode) to cool the battery 12 with a relatively low rate of cooling air in a step S88.

According to the present invention, as described above, when the charging efficiency η determined from the SOC and the battery temperature Tb is smaller than the charging efficiency lower limit ηt, the charging of the battery 12 is temporarily stopped at a low efficiency for thereby preventing the supplied electric energy from being wasted.

The charging of the battery 12 is continued only when the charging efficiency η is higher than the predetermined value, and stopped when the charging efficiency η is lower than the predetermined value. Consequently, a wasteful consumption of electric energy is minimized.

Furthermore, after the charging of the battery 12 is completed, if the battery temperature is higher than the predetermined temperature, the battery 12 is cooled to prevent itself from being deteriorated due to an increased in the battery temperature.

Although certain preferred embodiments of the present invention have been shown and described in detail, it should be understood that various changes and modifications may be made therein without departing from the scope of the appended claims.

What is claimed is:

1. A battery charging apparatus comprising:

a battery;

a battery charger for charging said battery;

battery temperature detecting means for detecting a temperature of said battery in a charging mode;

battery remaining-capacity detecting means for detecting a present remaining capacity of said battery in said charging mode; and charging control means for controlling charging of said battery with said battery charger;

said charging control means including:

charging efficiency detecting means including means for detecting a charging efficiency based on the temperature of said battery detected by said battery temperature detecting means and the present remaining capacity of said battery detected by said battery remaining-capacity detecting means; and charging stopping means for stopping charging of said battery with said battery charger when said charging efficiency detected by said charging efficiency detecting means is lower than a predetermined value.

2. A battery charging apparatus according to claim 1, further comprising:

battery cooling means for forcibly cooling said battery;

said charging control means comprising means for controlling said battery cooling means to forcibly cool said battery after the charging of said battery with said battery charger is completed.

3. A battery charging apparatus according to claim 1, further comprising:

battery cooling means for forcibly cooling said battery;

said charging control means comprising means for controlling said battery cooling means to forcibly cool said battery when the temperature of said battery detected by said battery temperature detecting means is higher than a predetermined temperature after the charging of said battery with said battery charger is completed.

4. A battery charging apparatus according to claim 1, wherein said charging efficiency detecting means comprises means for referring to a predetermined association between charged remaining capacities and charging efficiencies at battery temperatures as a parameter to detect said charging efficiency.

5. A battery charging apparatus comprising:

a battery;

a battery charger for charging said battery;

battery temperature detecting means for detecting a temperature of said battery in a charging mode;

battery remaining-capacity detecting means for detecting a present remaining capacity of said battery in said charging mode;

battery cooling means for forcibly cooling said battery with electric energy supplied through said battery charger; and charging control means for controlling charging of said battery with said battery charger;

said charging control means including:

charging efficiency detecting means for detecting a charging efficiency with which to charge said battery based on the temperature of said battery detected by said battery temperature detecting means and the present remaining capacity of said battery detected by said battery remaining-capacity detecting means;

charging stopping means for stopping charging of said battery with said battery charger when said charging efficiency detected by said charging efficiency detecting means is lower than a predetermined value; and means for activating said battery cooling means to forcibly cool said battery when the temperature of said battery detected by said battery temperature detecting means is higher than a predetermined temperature.

6. A battery charging apparatus according to claim 5, wherein said charging efficiency detecting means comprises means for referring to a predetermined association between remaining capacities and charging efficiencies at battery temperatures as a parameter to detect said charging efficiency.

7. A battery charging apparatus comprising:

a battery;

a battery charger for charging said battery;

battery temperature detecting means for detecting a temperature of said battery in a charging mode;

battery remaining-capacity detecting means for detecting a present remaining capacity of said battery in said charging mode;

battery cooling means for forcibly cooling said battery with electric energy supplied through said battery charger when the temperature of said battery detected by said battery temperature detecting means is higher than a predetermined temperature; and charging control means for controlling charging of said battery with said battery charger;

said charging control means including means for referring to a predetermined association between charging interruption temperatures and charging recovery temperatures, which are lower than said charging interruption temperatures, with respect to remaining capacities of said battery, based on the temperature of said battery detected by said battery temperature detecting means and the present remaining capacity of said battery detected by said battery remaining-capacity detecting means while said battery is being charged by said battery charger, to determine an interruption of the charging of said battery and recovery from the interruption of the charging of said battery, and activate said battery cooling means to cool said battery when the interruption of the charging of said battery is determined and thereafter resume the charging of said battery.

8. A battery charging apparatus according to claim 7, wherein said charging control means comprises means for determining a completion of the charging of the battery when the battery is charged, and activating said battery cooling means to cool said battery when the temperature of said battery detected by said battery temperature detecting means is higher than the predetermined temperature at the time the completion of the charging of the battery is determined.

9. A battery charging apparatus according to claim 7, wherein said charging control means comprises means for determining a completion of the charging of the battery when the battery is charged, and activating said battery cooling means for a period of time to cool said battery when the temperature of said battery detected by said battery temperature detecting means is higher than the predetermined temperature at the time the completion of the charging of the battery is determined.

\* \* \* \* \*